US012785279B2

(12) United States Patent
Fan et al.

(10) Patent No.: US 12,785,279 B2
(45) Date of Patent: Nov. 3, 2026

(54) COUPLED ANTENNA MODULE

(71) Applicant: INPAQ TECHNOLOGY CO., LTD., Miaoli County (TW)

(72) Inventors: Yang-Hsin Fan, Hsinchu County (TW); Cheng-Yi Wang, New Taipei City (TW); Lee-Ting Hsieh, Miaoli County (TW)

(73) Assignee: INPAQ TECHNOLOGY CO., LTD., Miaoli County (TW)

( * ) Notice: Subject to any disclaimer, the term of this patent is extended or adjusted under 35 U.S.C. 154(b) by 23 days.

(21) Appl. No.: 19/014,436

(22) Filed: Jan. 9, 2025

(65) Prior Publication Data

US 2026/0163239 A1 Jun. 11, 2026

(30) Foreign Application Priority Data

Dec. 6, 2024 (TW) ................................ 113147332

(51) Int. Cl.
*H01Q 5/10* (2015.01)
*H01Q 9/04* (2006.01)

(52) U.S. Cl.
CPC ............. *H01Q 9/0414* (2013.01); *H01Q 5/10* (2015.01)

(58) Field of Classification Search
None
See application file for complete search history.

(56) References Cited

U.S. PATENT DOCUMENTS 10,348,357 B2 * 7/2019 Liao ........................ H01Q 5/335
2007/0139277 A1 * 6/2007 Nissinen ................ H01Q 5/321 343/702
2009/0302120 A1 * 12/2009 Omura ..................... G03H 1/02 235/492
2015/0035713 A1 * 2/2015 Goto ........................ H01Q 5/50 343/749

FOREIGN PATENT DOCUMENTS

JP 2011061638 A * 3/2011

* cited by examiner

*Primary Examiner* — Dameon E Levi
*Assistant Examiner* — Anh Ho
(74) *Attorney, Agent, or Firm* — Li & Cai Intellectual Property (USA) Office

(57) ABSTRACT

A coupled antenna module includes an antenna carrying substrate, a first antenna structure and a second antenna structure. The first antenna structure has a first radiation layer disposed on the upper surface of the antenna carrying substrate, a first extension layer disposed on the first side surface of the antenna carrying substrate, and a first conductive layer disposed on the lower surface of the antenna carrying substrate. The second antenna structure has a second radiation layer disposed on the upper surface of the antenna carrying substrate, a second extension layer disposed on the second side surface of the antenna carrying substrate, and a second conductive layer disposed on the lower surface of the antenna carrying substrate. The first antenna structure and the second antenna structure can be configured to be applied to a first antenna operating frequency range and a second antenna operating frequency range, respectively.

10 Claims, 13 Drawing Sheets

COUPLED ANTENNA MODULE

CROSS-REFERENCE TO RELATED PATENT APPLICATION

This application claims the benefit of priority to Taiwan Patent Application No. 113147332, filed on Dec. 6, 2024. The entire content of the above identified application is incorporated herein by reference.

Some references, which may include patents, patent applications and various publications, may be cited and discussed in the description of this disclosure. The citation and/or discussion of such references is disposed merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an antenna module, and more particularly to a coupled antenna module.

BACKGROUND OF THE DISCLOSURE

In the related art, an antenna coupling technology is a technology that couples an antenna to an RF front-end. Its main purpose is to achieve more efficient circuit design and better RF performance. Mobile communication systems can achieve better performance in wireless communications through antenna coupling technology. However, the coupled antenna module in the related art still have room for improvement.

SUMMARY OF THE DISCLOSURE

In response to the above-referenced technical inadequacy, the present disclosure provides a coupled antenna module.

In order to solve the above-mentioned problems, one of the technical aspects adopted by the present disclosure is to provide a coupled antenna module, which includes an antenna carrying substrate, a first antenna structure and a second antenna structure. The antenna carrying substrate has an upper surface, a lower surface, a first side surface, a second side surface, a third side surface and a fourth side surface, in which the upper surface and the lower surface correspond to each other, the first side surface and the second side surface are connected between the upper surface and the lower surface and correspond to each other, and the third side surface and the fourth side surface are connected between the upper surface and the lower surface and correspond to each other. The first antenna structure is disposed on the upper surface, the lower surface and the first side surface of the antenna carrying substrate, and the second antenna structure is disposed on the upper surface, the lower surface and the second side surface of the antenna carrying substrate. The first antenna structure has a first radiation layer disposed on the upper surface of the antenna carrying substrate, a first extension layer disposed on the first side surface of the antenna carrying substrate, and a first conductive layer disposed on the lower surface of the antenna carrying substrate. The second antenna structure has a second radiation layer disposed on the upper surface of the antenna carrying substrate, a second extension layer disposed on the second side surface of the antenna carrying substrate, and a second conductive layer disposed on the lower surface of the antenna carrying substrate. An area of the first antenna structure is greater than, equal to or smaller than an area of the second antenna structure. The first antenna structure is configured to be applied to a first antenna operating frequency range, the second antenna structure is configured to be applied to a second antenna operating frequency range, and the first antenna operating frequency range is greater than, equal to or less than the second antenna operating frequency range. The first radiation layer of the first antenna structure has a first base portion, a first extending portion extending from the first base portion toward the second side surface, and a first bending portion bending from the first extending portion toward the third side surface. The second radiation layer of the second antenna structure has a second base portion, a second extending portion extending from the second base portion toward the first side surface, and a second bending portion bending from the second extending portion toward the fourth side surface. The first bending portion of the first radiation layer is disposed between the second base portion and the second bending portion of the second radiation layer, and the second bending portion of the second radiation layer is disposed between the first base portion and the first bending portion of the first radiation layer.

In order to solve the above-mentioned problems, another one of the technical aspects adopted by the present disclosure is to provide a coupled antenna module, which includes an antenna carrying substrate, a first antenna structure and a second antenna structure. The antenna carrying substrate has an upper surface, a lower surface, a first side surface, a second side surface, a third side surface and a fourth side surface. The first antenna structure is disposed on the upper surface, the lower surface and the first side surface of the antenna carrying substrate, and the second antenna structure is disposed on the upper surface, the lower surface and the second side surface of the antenna carrying substrate. The first antenna structure has a first radiation layer disposed on the upper surface of the antenna carrying substrate, a first extension layer disposed on the first side surface of the antenna carrying substrate, and a first conductive layer disposed on the lower surface of the antenna carrying substrate. The second antenna structure has a second radiation layer disposed on the upper surface of the antenna carrying substrate, a second extension layer disposed on the second side surface of the antenna carrying substrate, and a second conductive layer disposed on the lower surface of the antenna carrying substrate. The first radiation layer of the first antenna structure has a first base portion, a first extending portion extending from the first base portion toward the second side surface, and a first bending portion bending from the first extending portion toward the third side surface. The second radiation layer of the second antenna structure has a second base portion, a second extending portion extending from the second base portion toward the first side surface, and a second bending portion bending from the second extending portion toward the fourth side surface.

In order to solve the above-mentioned problems, yet another one of the technical aspects adopted by the present disclosure is to provide a coupled antenna module disposed between a first conductive layout layer and a second conductive layout layer of a circuit substrate, and one of the first conductive layout layer and the second conductive layout layer is electrically connected to an antenna signal feeding cable. The coupled antenna module includes an antenna carrying substrate, a first antenna structure and a second antenna structure. The antenna carrying substrate has an upper surface, a lower surface, a first side surface, a second side surface, a third side surface and a fourth side surface. The first antenna structure is disposed on the upper surface, the lower surface and the first side surface of the antenna carrying substrate, and the second antenna structure is disposed on the upper surface, the lower surface and the second side surface of the antenna carrying substrate. The first antenna structure has a first radiation layer disposed on the upper surface of the antenna carrying substrate, a first extension layer disposed on the first side surface of the antenna carrying substrate, and a first conductive layer disposed on the lower surface of the antenna carrying substrate. The second antenna structure has a second radiation layer disposed on the upper surface of the antenna carrying substrate, a second extension layer disposed on the second side surface of the antenna carrying substrate, and a second conductive layer disposed on the lower surface of the antenna carrying substrate. The first radiation layer of the first antenna structure has a first base portion, a first extending portion extending from the first base portion toward the second side surface, and a first bending portion bending from the first extending portion toward the third side surface. The second radiation layer of the second antenna structure has a second base portion, a second extending portion extending from the second base portion toward the first side surface, and a second bending portion bending from the second extending portion toward the fourth side surface.

Therefore, in the coupled antenna module provided by the present disclosure, by virtue of "the first antenna structure having a first radiation layer disposed on the upper surface of the antenna carrying substrate, a first extension layer disposed on the first side surface of the antenna carrying substrate, and a first conductive layer disposed on the lower surface of the antenna carrying substrate," "the second antenna structure having a second radiation layer disposed on the upper surface of the antenna carrying substrate, a second extension layer disposed on the second side surface of the antenna carrying substrate, and a second conductive layer disposed on the lower surface of the antenna carrying substrate," "the first radiation layer of the first antenna structure having a first base portion, a first extending portion extending from the first base portion toward the second side surface, and a first bending portion bending from the first extending portion toward the third side surface" and "the second radiation layer of the second antenna structure having a second base portion, a second extending portion extending from the second base portion toward the first side surface, and a second bending portion bending from the second extending portion toward the fourth side surface," the first antenna structure can be configured to be applied to a first antenna operating frequency range according to different requirements, and the second antenna structure can be configured to be applied to a second antenna operating frequency range according to different requirements.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
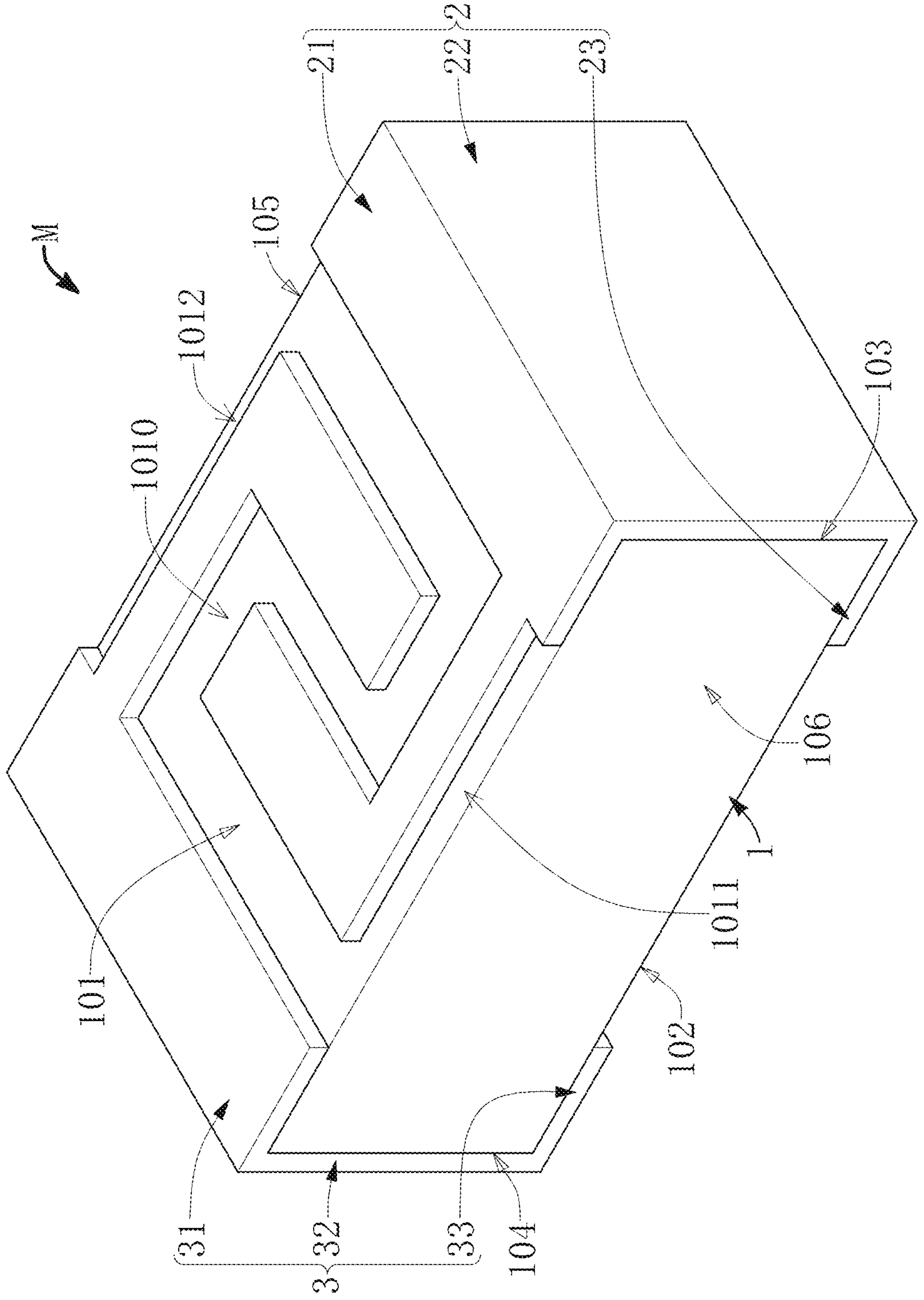
FIG. 1 is a schematic perspective view of a coupled antenna module according to a first embodiment of the present disclosure.

The present disclosure is more particularly described in the following embodiments and examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1 to FIG. 4, a first embodiment of the present disclosure provides a coupled antenna module M (or a monopole coupled dual-band antenna), which includes an antenna carrying substrate 1 (or an antenna carrier substrate), a first antenna structure 2 and a second antenna structure 3. It should be noted that the first antenna structure 2 can be configured to be applied to a first antenna operating frequency range, the second antenna structure 3 can be configured to be applied to a second antenna operating frequency range, and the first antenna operating frequency range can be greater than, equal to or less than the second antenna operating frequency range according to different requirements.

Figure 2:
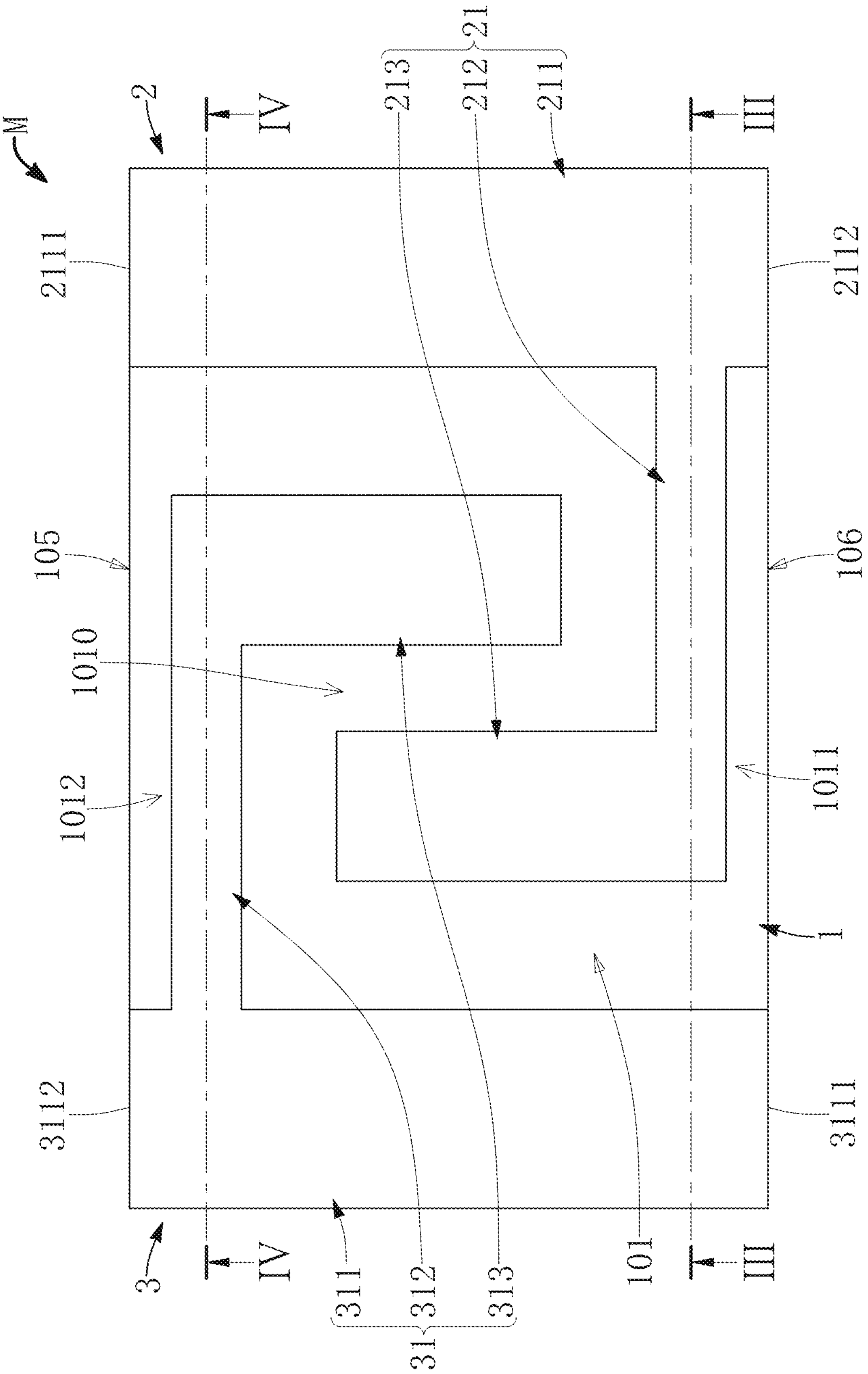
FIG. 2 is a schematic top view of the coupled antenna module according to the first embodiment of the present disclosure.

More particularly, referring to FIG. 1 and FIG. 2, the antenna carrying substrate 1 has an upper surface 101, a lower surface 102, a first side surface 103, a second side surface 104, a third side surface 105 and a fourth side surface 106, in which the upper surface 101 and the lower surface 102 can correspond to each other (or be opposite to each other), the first side surface 103 and the second side surface 104 can be connected between the upper surface 101 and the lower surface 102 and correspond to each other (or be opposite to each other), and the third side surface 105 and the fourth side surface 106 can be connected between the upper surface 101 and the lower surface 102 and correspond to each other (or be opposite to each other). For example, the antenna carrying substrate 1 may have a rectangular shape, a rectangular-like shape or any possible shape, and the antenna carrying substrate 1 can be made of any kind of insulating material or high dielectric material (such as ceramic or ceramic-like material). However, the aforementioned details are disclosed for exemplary purposes only, and are not meant to limit the scope of the present disclosure.

More particularly, referring to FIG. 1 and FIG. 2, the first antenna structure 2 can be disposed on the upper surface 101, the lower surface 102 and the first side surface 103 of the antenna carrying substrate 1, and the first antenna structure 2 may have a first radiation layer 21 (or a first top conductive layer) disposed on the upper surface 101 of the antenna carrying substrate 1, a first extension layer 22 (or a first side conductive layer) disposed on the first side surface 103 of the antenna carrying substrate 1, and a first conductive layer 23 (or a first bottom soldering layer) disposed on the lower surface 102 of the antenna carrying substrate 1. In addition, the second antenna structure 3 can be disposed on the upper surface 101, the lower surface 102 and the second side surface 104 of the antenna carrying substrate 1, and the second antenna structure 3 may have a second radiation layer 31 (or a second top conductive layer) disposed on the upper surface 101 of the antenna carrying substrate 1, a second extension layer 32 (or a second side conductive layer) disposed on the second side surface 104 of the antenna carrying substrate 1, and a second conductive layer 33 (or a second bottom soldering layer) disposed on the lower surface 102 of the antenna carrying substrate 1.

Figure 3:
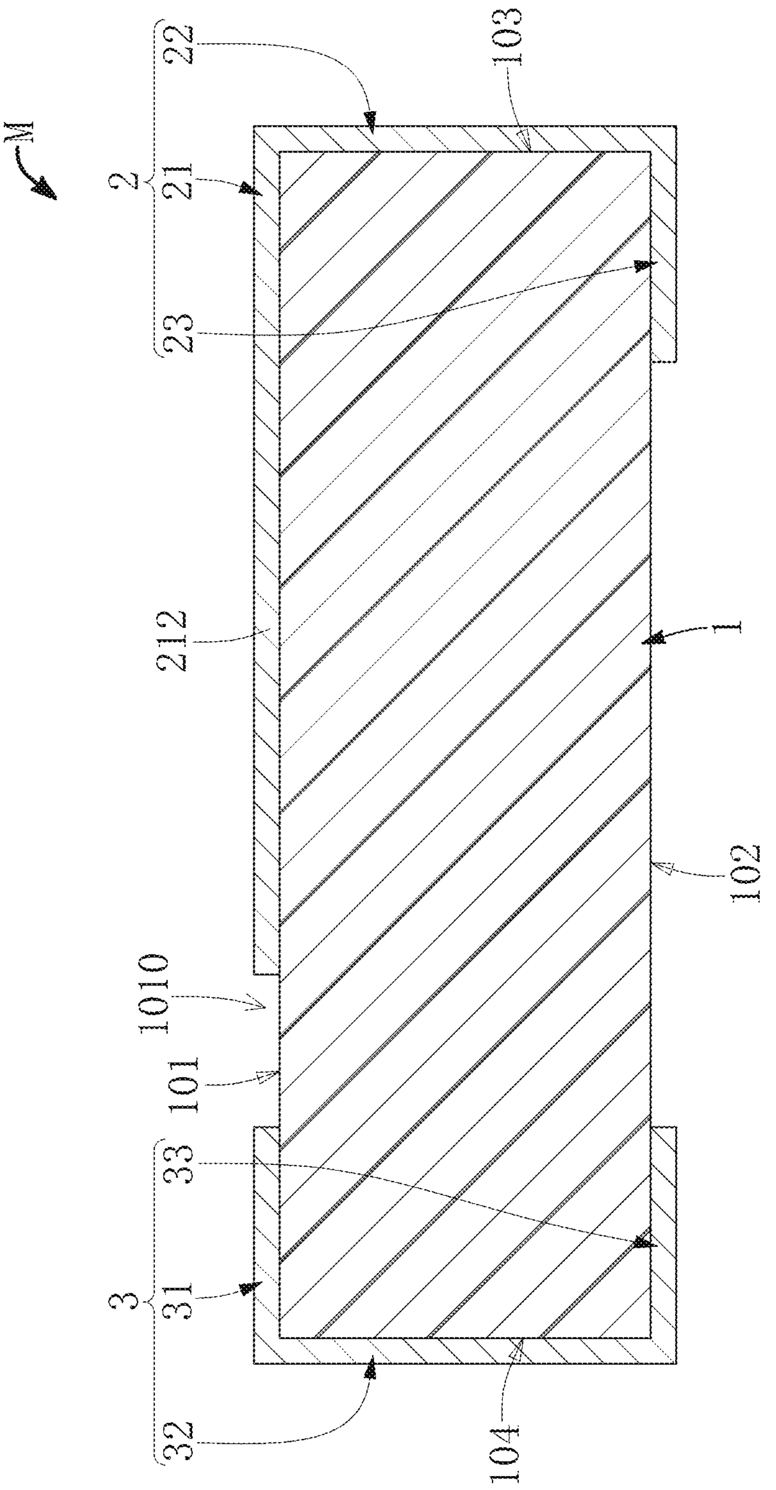
FIG. 3 is a schematic cross-sectional view taken along line III-III of FIG. 2.
Figure 4:
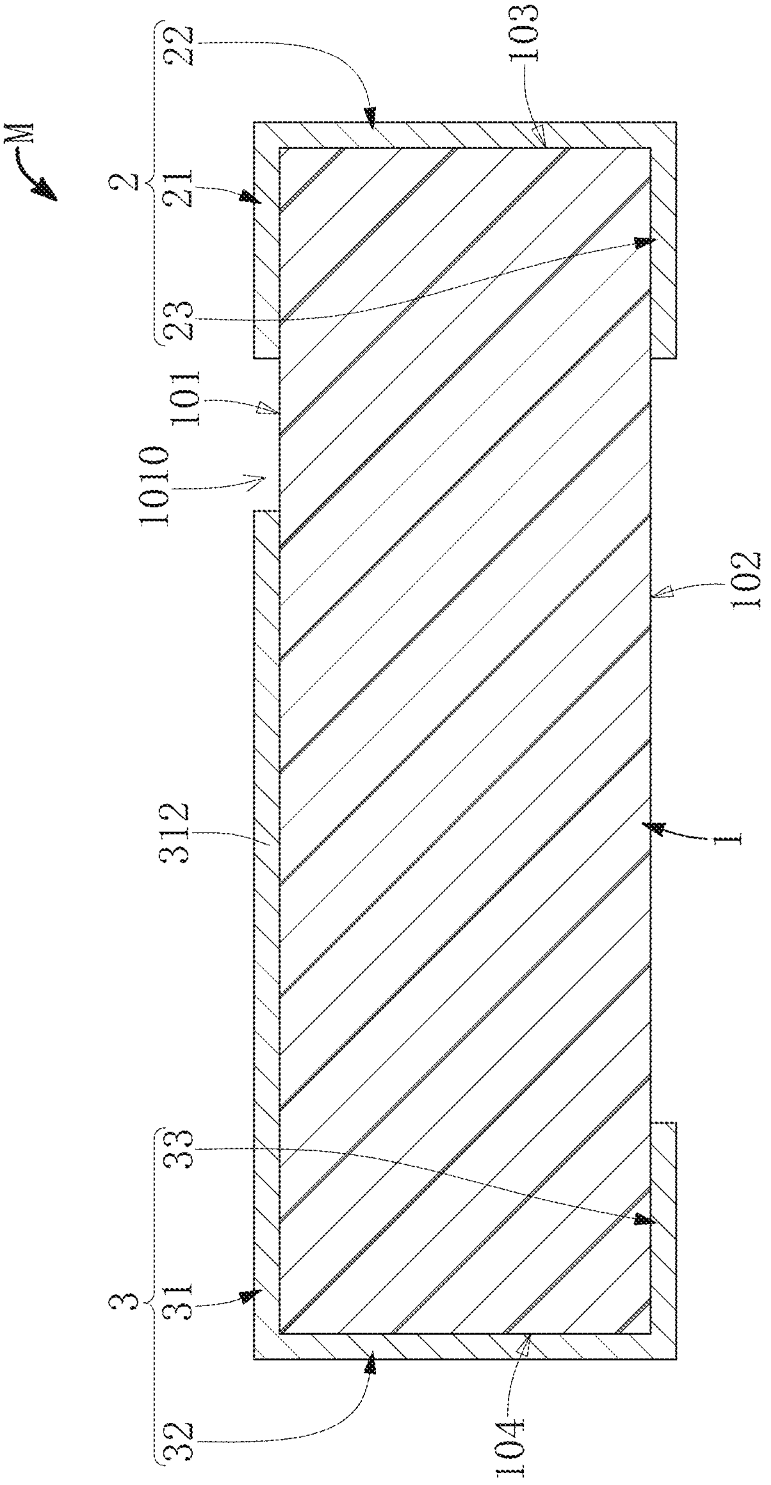
FIG. 4 is a schematic cross-sectional view taken along line IV-IV of FIG. 2.

For example, referring to FIG. 1, FIG. 2 and FIG. 3, in one of the feasible embodiments, the first radiation layer 21 of the first antenna structure 2 may have a first base portion 211, a first extending portion 212 extending from the first base portion 211 toward the second side surface 104, and a first bending portion 213 bending from the first extending portion 212 (such as bending about 90 degrees) toward the third side surface 105, and the first bending portion 213 of the first radiation layer 21 can be disposed between the second base portion 311 and the second bending portion 313 of the second radiation layer 31. In addition, referring to FIG. 1, FIG. 2 and FIG. 4, in one of the feasible embodiments, the second radiation layer 31 of the second antenna structure 3 may have a second base portion 311, a second extending portion 312 extending from the second base portion 311 toward the first side surface 103, and a second bending portion 313 bending from the second extending portion 312 (such as bending about 90 degrees) toward the fourth side surface 106, and the second bending portion 313 of the second radiation layer 31 can be disposed between the first base portion 211 and the first bending portion 213 of the first radiation layer 21. It should be noted that the first antenna structure 2 is not disposed (is not provided) on the third side surface 105 and the fourth side surface 106 of the antenna carrying substrate 1, and the second antenna structure 3 is not disposed (is not provided) on the third side surface 105 and the fourth side surface 106 of the antenna carrying substrate 1, so that both the third side surface 105 and the fourth side surface 106 of the antenna carrying substrate 1 can have a clear area. However, the aforementioned details are disclosed for exemplary purposes only, and are not meant to limit the scope of the present disclosure.

For example, as shown in FIG. 2, in one of the feasible embodiments, for the first radiation layer 21 of the first antenna structure 2, a length of the first base portion 211 can be greater than, equal to, or less than a length of the first bending portion 213, the length of the first bending portion 213 can be greater than, equal to, or less than a length of the first extending portion 212, a width of the first base portion 211 can be greater than, equal to, or less than a width of the first bending portion 213, and the width of the first bending portion 213 can be greater than, equal to, or less than a width of the first extending portion 212. Moreover, as shown in FIG. 2, in one of the feasible embodiments, for the second radiation layer 31 of the second antenna structure 3, a length of the second base portion 311 can be greater than, equal to, or less than a length of the second bending portion 313, the length of the second bending portion 313 can be greater than, equal to, or less than a length of the second extending portion 312, a width of the second base portion 311 can be greater than, equal to, or less than a width of the second bending portion 313, and the width of the second bending portion 313 can be greater than, equal to, or less than a width of the second extending portion 312. In addition, as shown in FIG. 2, in one of the feasible embodiments, an area of the first base portion 211 of the first radiation layer 21 can be greater than, equal to or smaller than an area of the second base portion 311 of the second radiation layer 31, an area of the first extending portion 212 of the first radiation layer 21 can be greater than, equal to, or smaller than the second extending portion 312 of the second radiation layer 31, and an area of the first bending portion 213 of the first radiation layer 21 can be greater than, equal to, or smaller than an area of the second bending portion 313 of the second radiation layer 31 (That is to say, according to different requirements, the area of the first antenna structure 2 may be greater than, equal to, or smaller than the area of the second antenna structure 3). However, the aforementioned details are disclosed for exemplary purposes only, and are not meant to limit the scope of the present disclosure.

For example, as shown in FIG. 2, in one of the feasible embodiments, the upper surface 101 of the antenna carrying substrate 1 may have a continuous meandering area 1010, and the continuous meandering area 1010 can be located between the first antenna structure 2 and the second antenna structure 3. Moreover, the upper surface 101 of the antenna carrying substrate 1 may have a first separation area 1011 connected to a first end of the continuous meandering area 1010, and the first separation area 1011 can be located between the first extending portion 212 and the fourth side surface 106 and between the first bending portion 213 and the fourth side surface 106, thereby separating the first extending portion 212 and the first bending portion 213 of the first radiation layer 21 from the fourth side surface 106 by a first predetermined distance. In addition, the upper surface 101 of the antenna carrying substrate 1 may have a second separation area 1012 connected to a second end of the continuous meandering area 1010, and the second separation area 1012 can be located between the second extending portion 312 and the third side surface 105 and between the second bending portion 313 and the third side surface 105, thereby separating the second extending portion 312 and the second bending portion 313 of the second radiation layer 31 from the third side surface 105 by a second predetermined distance. However, the aforementioned details are disclosed for exemplary purposes only, and are not meant to limit the scope of the present disclosure.

For example, as shown in FIG. 2, in one of the feasible embodiments, the first base portion 211 of the first radiation layer 21 may have a first lateral end 2111 flush with the third side surface 105, and a second lateral end 2112 flush with the fourth side surface 106, the second lateral end 2112 of the first base portion 211 and the first extending portion 212 are not flush with each other, and the first extending portion 212 of the first radiation layer 21 can be disposed away from the first lateral end 2111 of the first base portion 211 and adjacent to the second lateral end 2112 of the first base portion 211. In addition, the second base portion 311 of the second radiation layer 31 may have a first lateral end 3111 flush with the fourth side surface 106, and a second lateral end 3112 flush with the third side surface 105, the second lateral end 3112 of the second base portion 311 and the second extending portion 312 are not flush with each other, and the second extending portion 312 of the second radiation layer 31 can be disposed away from the first lateral end 3111 of the second base portion 311 and adjacent to the second lateral end 3112 of the second base portion 311. However, the aforementioned details are disclosed for exemplary purposes only, and are not meant to limit the scope of the present disclosure.

Second Embodiment

Figure 5:
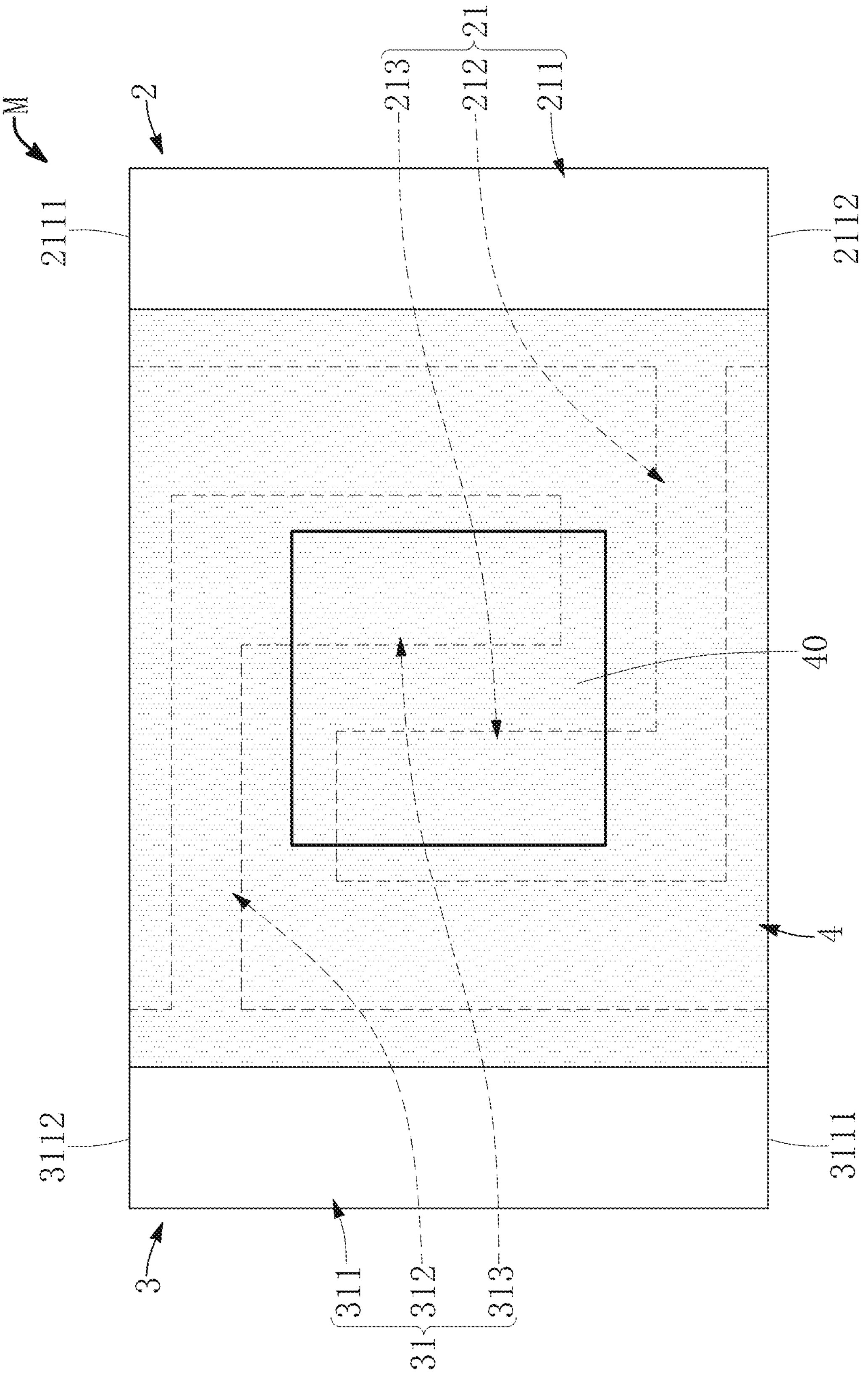
FIG. 5 is a schematic top view of the coupled antenna module according to a second embodiment of the present disclosure.

Referring to FIG. 5, a second embodiment of the present disclosure provides a coupled antenna module M. The main difference between the second embodiment and the first embodiment is as follows: in the second embodiment, the first extending portion 212 and the first bending portion 213 of the first radiation layer 21 of the first antenna structure 2 and the second extending portion 312 and the second bending portion 313 of the second radiation layer 31 of the second antenna structure 3 can be completely covered or enclosed by an insulating protective layer 4. It should be noted that in one of the feasible embodiments, the first base portion 211 of the first radiation layer 21 of the first antenna structure 2 and the second base portion 311 of the second radiation layer 31 of the second antenna structure 3 can be partially covered by the insulating protective layer 4, and the insulating protective layer 4 may have a predetermined identification mark 40 (such as a product model). For example, the insulating protective layer 4 can be made of silicone, epoxy or any kind of insulating material. However, the aforementioned details are disclosed for exemplary purposes only, and are not meant to limit the scope of the present disclosure.

Third Embodiment

Referring to FIG. 6 to FIG. 10, a third embodiment of the present disclosure provides a coupled antenna module M. The main difference between the third embodiment and the first embodiment is as follows: in the third embodiment, the coupled antenna module M (such as the coupled antenna module M provided by the first embodiment) can be disposed between a first conductive layout layer P1 and a second conductive layout layer P2 of a circuit substrate P, and one of the first conductive layout layer P1 and the second conductive layout layer P2 can be electrically connected to an antenna signal feeding cable C (or a coaxial cable). It should be noted that the circuit substrate P may have a middle area PR1, a left area PR2 located beside a left side of the middle area PR1, and a right area PR3 located beside a right side of the middle area PR1, and the coupled antenna module M can be configured to be disposed on the middle area PR1, the left area PR2 or the right area PR3.

Figure 6:
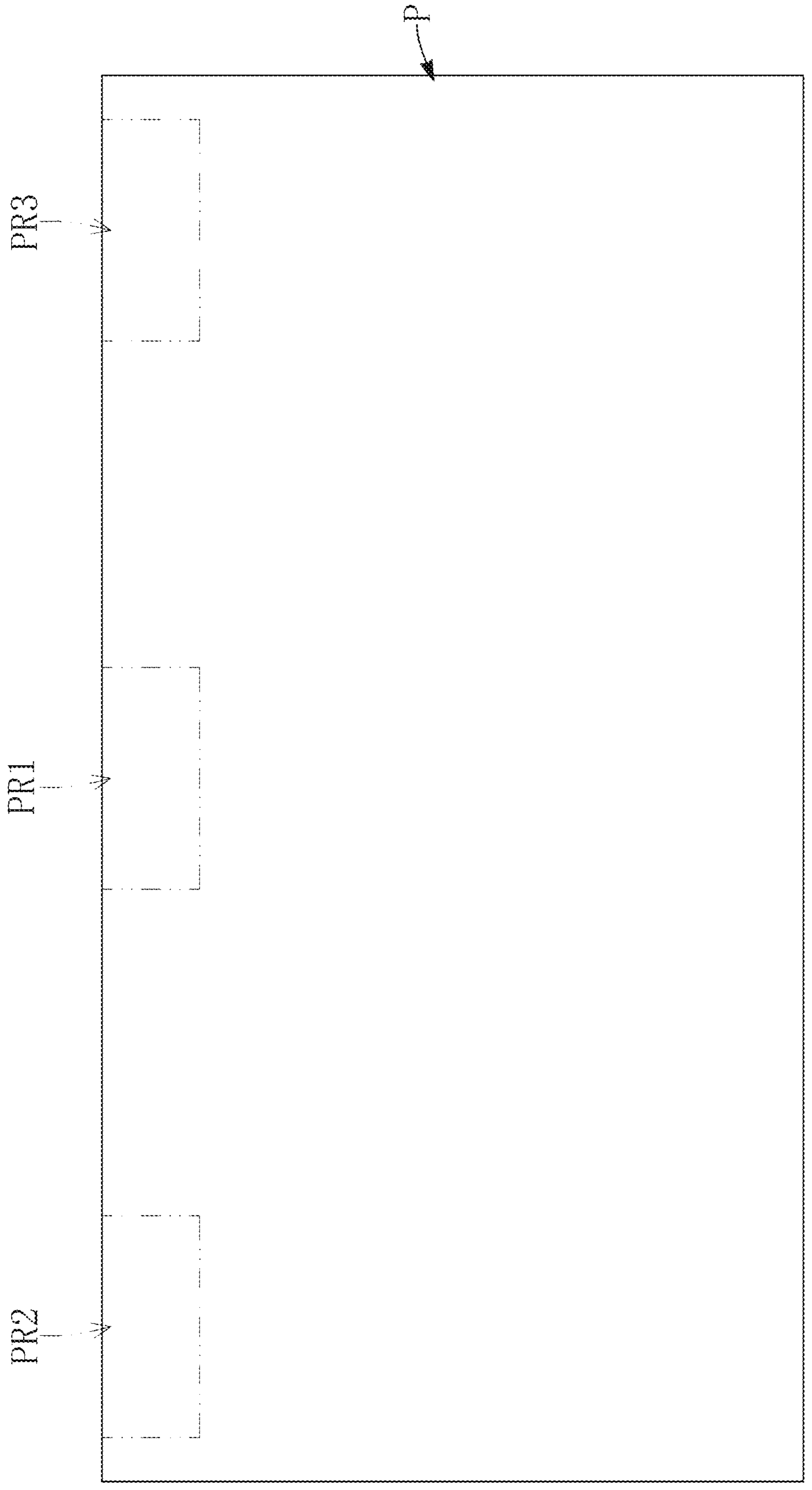
FIG. 6 is a schematic view showing that a circuit substrate may have a middle area, a left area and a right area according to a third embodiment of the present disclosure.
Figure 7:
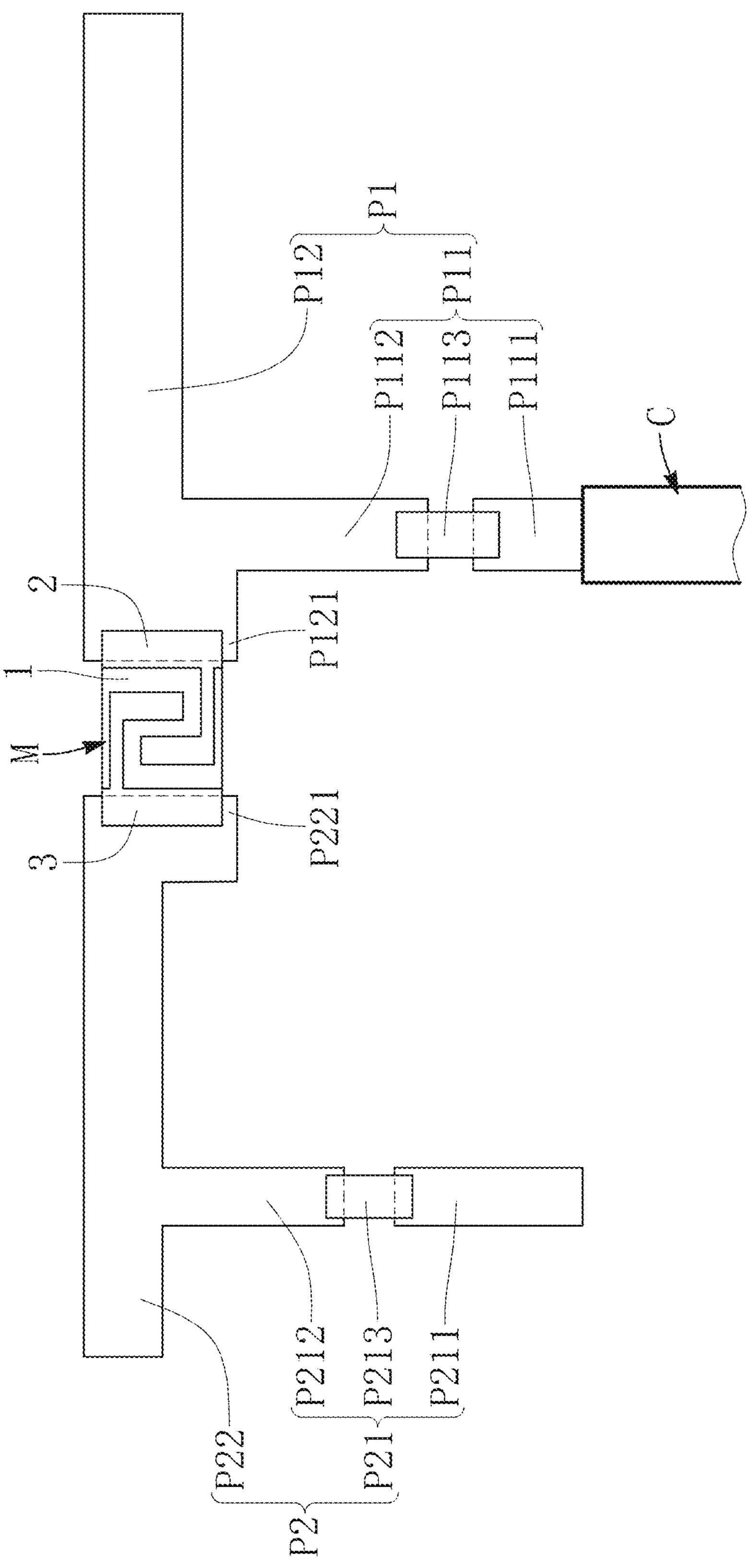
FIG. 7 is a schematic view of the coupled antenna module provided by the third embodiment of the present disclosure applied to a first circuit substrate.

For example, referring to FIG. 6 and FIG. 7, when the coupled antenna module M is configured to be disposed on the middle area PR1 or the left area PR2, the first conductive layout layer P1 of the circuit substrate P (or a first circuit substrate P) may have a first vertical extension portion P11 located beside the right side of the coupled antenna module M, and a first horizontal extension portion P12 connected to the first vertical extension portion P11, and the second conductive layout layer P2 of the circuit substrate P may have a second vertical extension portion P21 located beside the left side of the coupled antenna module M, and a second horizontal extension portion P22 connected to the second vertical extension portion P21. More particularly, the first vertical extension portion P11 of the first conductive layout layer P1 may have a first signal feeding section P111 electrically connected to the antenna signal feeding cable C, a second signal feeding section P112 electrically connected to the first horizontal extension portion P12, and a first electronic component P113 (such as a capacitor or an inductor) electrically connected between the first signal feeding section P111 and the second signal feeding section P112. In addition, the second vertical extension portion P21 of the second conductive layout layer P2 may have a first vertical extending section P211 insulated (or separated) from the antenna signal feeding cable C, a second vertical extending section P212 electrically connected to the second horizontal extension portion P22, and a second electronic component P213 (such as a capacitor or an inductor) electrically connected between the first vertical extending section P211 and the second vertical extending section P212. It should be noted that the first horizontal extension portion P12 of the first conductive layout layer P1 may have a first antenna carrying section P121, the second horizontal extension portion P22 of the second conductive layout layer P2 may have a second antenna carrying section P221, and the width of the coupled antenna module M can be smaller than a width of the first antenna carrying section P121 of the first horizontal extension portion P12 and a width of the second antenna carrying section P221 of the second horizontal extension portion P22, so that the first antenna structure 2 and the second antenna structure 3 of the coupled antenna module M can be electrically connected to the first antenna carrying section P121 of the first horizontal extension portion P12 and the second antenna carrying section P221 of the second horizontal extension part P22 through conductive materials, respectively. However, the aforementioned details are disclosed for exemplary purposes only, and are not meant to limit the scope of the present disclosure.

For example, referring to FIG. 6 and FIG. 7, when the coupled antenna module M is configured to be disposed on the right area PR3, the first conductive layout layer P1 of the circuit substrate P (or a second circuit substrate P) may have a first vertical extension portion P11 located beside the left side of the coupled antenna module M, and a first horizontal extension portion P12 connected to the first vertical extension portion P11, and the second conductive layout layer P2 of the circuit substrate P may have a second vertical extension portion P21 located beside the right side of the coupled antenna module M, and a second horizontal extension portion P22 connected to the second vertical extension portion P21. More particularly, the first vertical extension portion P11 of the first conductive layout layer P1 may have a first signal feeding section P111 electrically connected to the antenna signal feeding cable C, a second signal feeding section P112 electrically connected to the first horizontal extension portion P12, and a first electronic component P113 (such as a capacitor or an inductor) electrically connected between the first signal feeding section P111 and the second signal feeding section P112. In addition, the second vertical extension portion P21 of the second conductive layout layer P2 may have a first vertical extending section P211 insulated (or separated) from the antenna signal feeding cable C, a second vertical extending section P212 electrically connected to the second horizontal extension portion P22, and a second electronic component P213 (such as a capacitor or an inductor) electrically connected between the first vertical extending section P211 and the second vertical extending section P212. It should be noted that the first horizontal extension portion P12 of the first conductive layout layer P1 may have a first antenna carrying section P121, the second horizontal extension portion P22 of the second conductive layout layer P2 may have a second antenna carrying section P221, and the width of the coupled antenna module M can be smaller than a width of the first antenna carrying section P121 of the first horizontal extension portion P12 and a width of the second antenna carrying section P221 of the second horizontal extension portion P22, so that the first antenna structure 2 and the second antenna structure 3 of the coupled antenna module M can be electrically connected to the first antenna carrying section P121 of the first horizontal extension portion P12 and the second antenna carrying section P221 of the second horizontal extension part P22 through conductive materials, respectively. However, the aforementioned details are disclosed for exemplary purposes only, and are not meant to limit the scope of the present disclosure.

Figure 9:
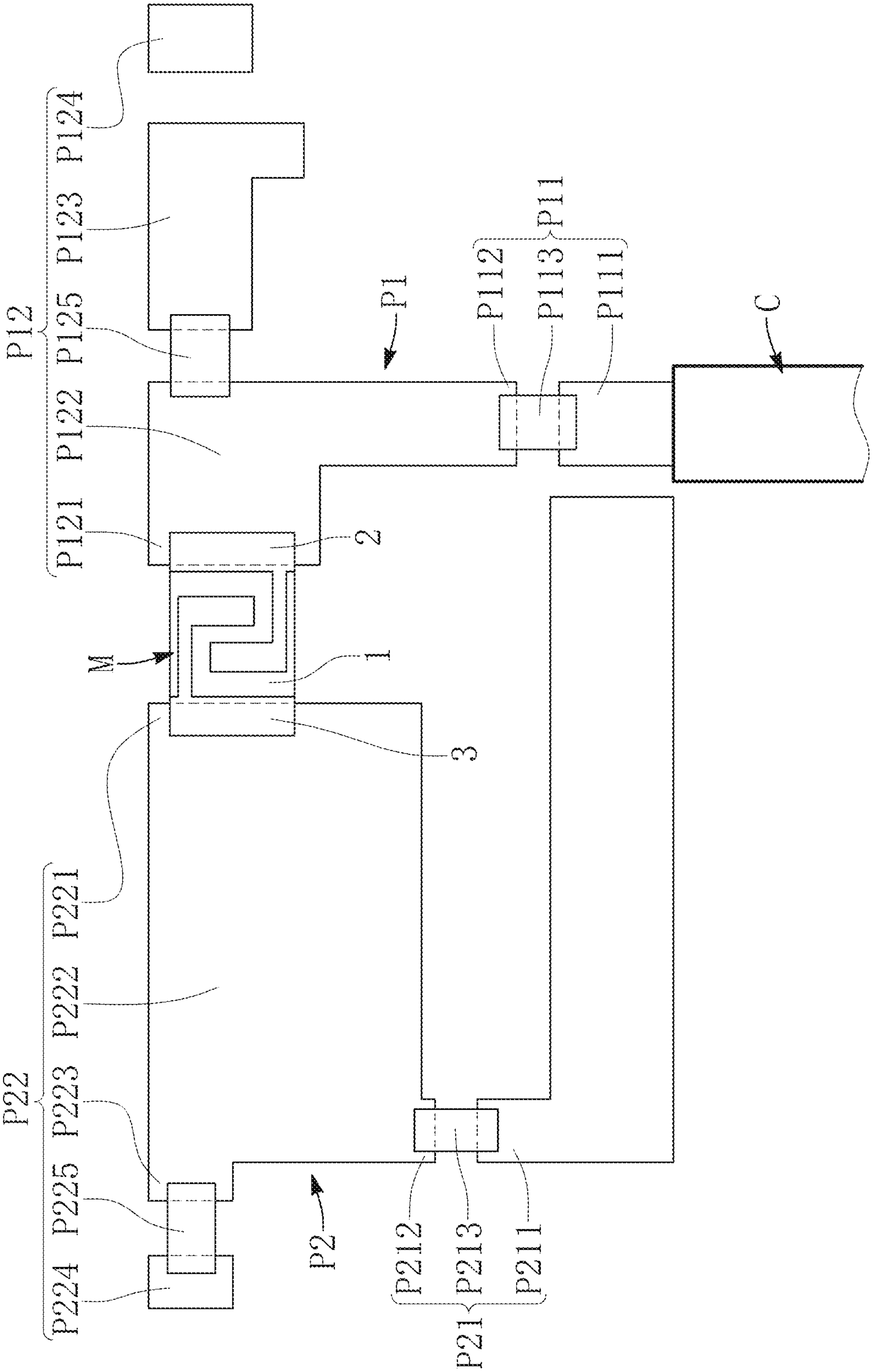
FIG. 9 is a schematic view of the coupled antenna module provided by the third embodiment of the present disclosure applied to a third circuit substrate.

For example, referring to FIG. 6 and FIG. 9, when the coupled antenna module M is configured to be disposed on the middle area PR1 or the left area PR2, the first conductive layout layer P1 of the circuit substrate P (or a third circuit substrate P) may have a first vertical extension portion P11 located beside the right side of the coupled antenna module M, and a first horizontal extension portion P12 connected to the first vertical extension portion P11, and the second conductive layout layer P2 of the circuit substrate P may have a second vertical extension portion P21 located beside the left side of the coupled antenna module M, and a second horizontal extension portion P22 connected to the second vertical extension portion P21. More particularly, the first vertical extension portion P11 of the first conductive layout layer P1 may have a first signal feeding section P111 electrically connected to the antenna signal feeding cable C, a second signal feeding section P112 electrically connected to the first horizontal extension portion P12, and a first electronic component P113 (such as a capacitor or an inductor) electrically connected between the first signal feeding section P111 and the second signal feeding section P112. In addition, the second vertical extension portion P21 of the second conductive layout layer P2 may have a first vertical extending section P211 insulated (or separated) from the antenna signal feeding cable C, a second vertical extending section P212 electrically connected to the second horizontal extension portion P22, and a second electronic component P213 (such as a capacitor or an inductor) electrically connected between the first vertical extending section P211 and the second vertical extending section P212. It should be noted that the first horizontal extension portion P12 of the first conductive layout layer P1 may have a first antenna carrying section P121, a first left extending section P122 electrically connected to the first antenna carrying section P121 and the second signal feeding section P112, a first middle extending section P123 located beside a right side of the first left extending section P122, a first right extending section P124 located beside a right side of the first middle extending section P123 and insulated from the first middle extending section P123, and a third electronic component P125 (such as a capacitor or an inductor) electrically connected between the first left extending section P122 and the first middle extending section P123. Moreover, the second horizontal extension portion P22 of the second conductive layout layer P2 may have a second antenna carrying section P221, a second right extending section P222 electrically connected to the second antenna carrying section P221, a second middle extending section P223 electrically connected to the second right extending section P222 and the second vertical extending section P212, a second left extending section P224 located beside a left side of the second middle extending section P223, and a fourth electronic component P225 (such as a capacitor or an inductor) electrically connected between the second middle extending section P223 and the second left extending section P224. In addition, the width of the coupled antenna module M can be smaller than a width of the first antenna carrying section P121 of the first horizontal extension portion P12 and a width of the second antenna carrying section P221 of the second horizontal extension portion P22, so that the first antenna structure 2 and the second antenna structure 3 of the coupled antenna module M can be electrically connected to the first antenna carrying section P121 of the first horizontal extension portion P12 and the second antenna carrying section P221 of the second horizontal extension part P22 through conductive materials, respectively. However, the aforementioned details are disclosed for exemplary purposes only, and are not meant to limit the scope of the present disclosure.

Figure 10:
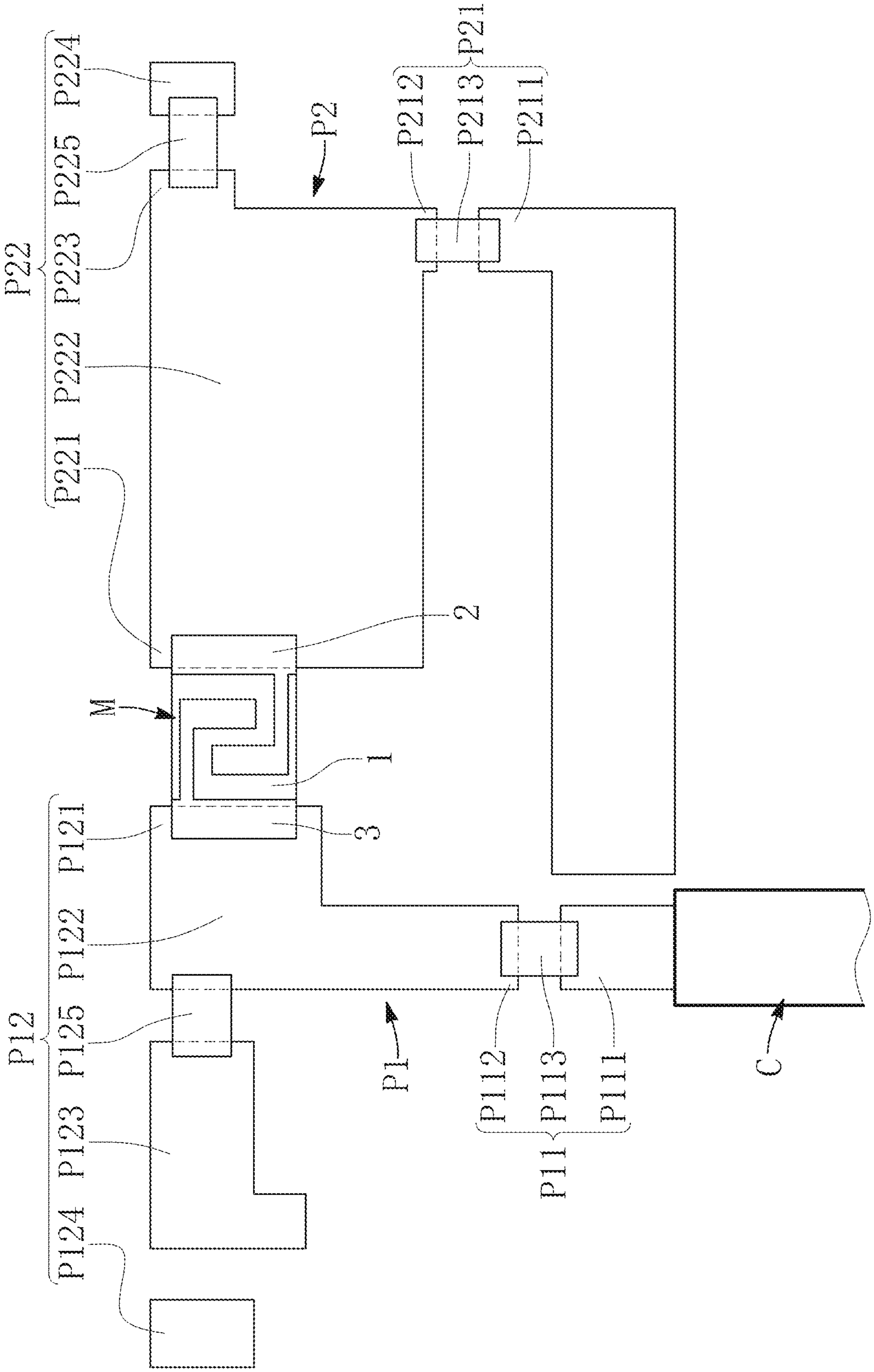
FIG. 10 is a schematic view of the coupled antenna module provided by the third embodiment of the present disclosure applied to a fourth circuit substrate.

For example, referring to FIG. 6 and FIG. 10, when the coupled antenna module M is configured to be disposed on the middle area PR1 or the left area PR2, the first conductive layout layer P1 of the circuit substrate P (or a fourth circuit substrate P) may have a first vertical extension portion P11 located beside the left side of the coupled antenna module M, and a first horizontal extension portion P12 connected to the first vertical extension portion P11, and the second conductive layout layer P2 of the circuit substrate P may have a second vertical extension portion P21 located beside the right side of the coupled antenna module M, and a second horizontal extension portion P22 connected to the second vertical extension portion P21. More particularly, the first vertical extension portion P11 of the first conductive layout layer P1 may have a first signal feeding section P111 electrically connected to the antenna signal feeding cable C, a second signal feeding section P112 electrically connected to the first horizontal extension portion P12, and a first electronic component P113 (such as a capacitor or an inductor) electrically connected between the first signal feeding section P111 and the second signal feeding section P112. In addition, the second vertical extension portion P21 of the second conductive layout layer P2 may have a first vertical extending section P211 insulated (or separated) from the antenna signal feeding cable C, a second vertical extending section P212 electrically connected to the second horizontal extension portion P22, and a second electronic component P213 (such as a capacitor or an inductor) electrically connected between the first vertical extending section P211 and the second vertical extending section P212. It should be noted that the first horizontal extension portion P12 of the first conductive layout layer P1 may have a first antenna carrying section P121, a first left extending section P122 electrically connected to the first antenna carrying section P121 and the second signal feeding section P112, a first middle extending section P123 located beside a left side of the first left extending section P122, a first right extending section P124 located beside a left side of the first middle extending section P123 and insulated from the first middle extending section P123, and a third electronic component P125 (such as a capacitor or an inductor) electrically connected between the first left extending section P122 and the first middle extending section P123. Moreover, the second horizontal extension portion P22 of the second conductive layout layer P2 may have a second antenna carrying section P221, a second right extending section P222 electrically connected to the second antenna carrying section P221, a second middle extending section P223 electrically connected to the second right extending section P222 and the second vertical extending section P212, a second left extending section P224 located beside a right side of the second middle extending section P223, and a fourth electronic component P225 (such as a capacitor or an inductor) electrically connected between the second middle extending section P223 and the second left extending section P224. In addition, the width of the coupled antenna module M can be smaller than a width of the first antenna carrying section P121 of the first horizontal extension portion P12 and a width of the second antenna carrying section P221 of the second horizontal extension portion P22, so that the first antenna structure 2 and the second antenna structure 3 of the coupled antenna module M can be electrically connected to the first antenna carrying section P121 of the first horizontal extension portion P12 and the second antenna carrying section P221 of the second horizontal extension part P22 through conductive materials, respectively. However, the aforementioned details are disclosed for exemplary purposes only, and are not meant to limit the scope of the present disclosure.

Figure 8:
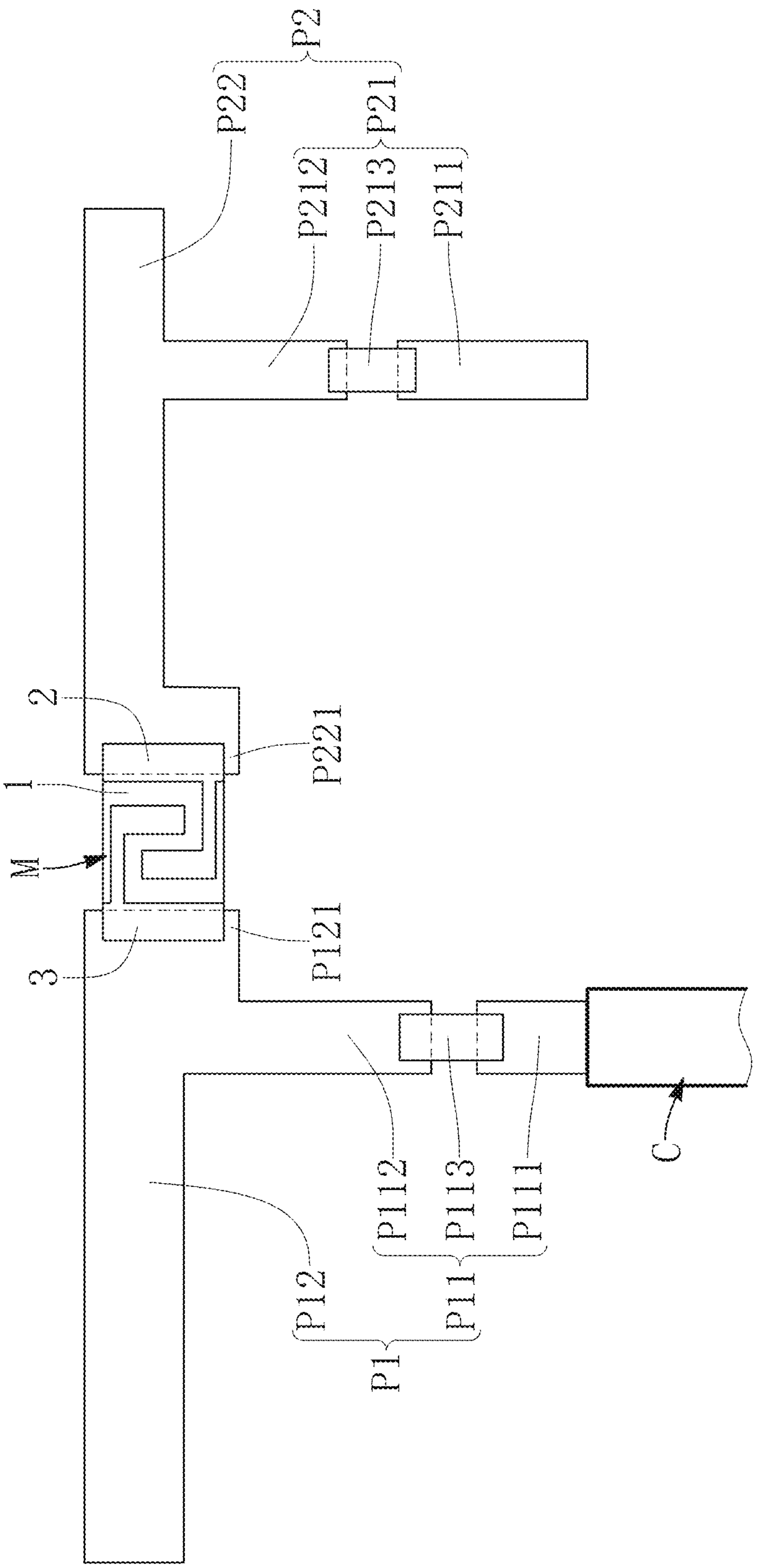
FIG. 8 is a schematic view of the coupled antenna module provided by the third embodiment of the present disclosure applied to a second circuit substrate.

It should be noted that referring to FIG. 1, FIG. 7, FIG. 8, FIG. 9 and FIG. 10, the first antenna carrying section P121 of the first horizontal extension portion P12 of the first conductive layout layer P1 and the second antenna carrying section P221 of the second horizontal extension portion P22 of the second conductive layout layer P2 are configured to carry the first conductive layer 23 of the first antenna structure 2 and the second conductive layer 33 of the second antenna structure 3, respectively (as shown in FIG. 7 or FIG. 9), or to carry the second conductive layer 33 of the second antenna structure 3 and the first conductive layer 23 of the first antenna structure 2, respectively (as shown in FIG. 8 or FIG. 10). Therefore, referring to FIG. 1 and FIG. 7 (or FIG. 9), in one of the feasible embodiments, when the coupled antenna module M is disposed between the first horizontal extension portion P12 of the first conductive layout layer P1 and the second horizontal extension portion P22 of the second conductive layout layer P2, the first conductive layer 23 of the first antenna structure 2 and the second conductive layer 33 of the second antenna structure 3 can be electrically connected to the first horizontal extension portion P12 of the first conductive layout layer P1 and said second horizontal extension portion P22 of the second conductive layout layer P2 through a plurality of conductive materials, respectively. In addition, referring to FIG. 1 and FIG. 8 (or FIG. 10), in one of the feasible embodiments, when the coupled antenna module M is disposed between the first horizontal extension portion P12 of the first conductive layout layer P1 and the second horizontal extension portion P22 of the second conductive layout layer P2, the first conductive layer 23 of the first antenna structure 2 and the second conductive layer 33 of the second antenna structure 3 can be electrically connected to the second horizontal extension portion P22 of the second conductive layout layer P2 and the first horizontal extension portion P12 of the first conductive layout layer P1 through a plurality of conductive materials, respectively. However, the aforementioned details are disclosed for exemplary purposes only, and are not meant to limit the scope of the present disclosure.

Fourth Embodiment

Figure 11:
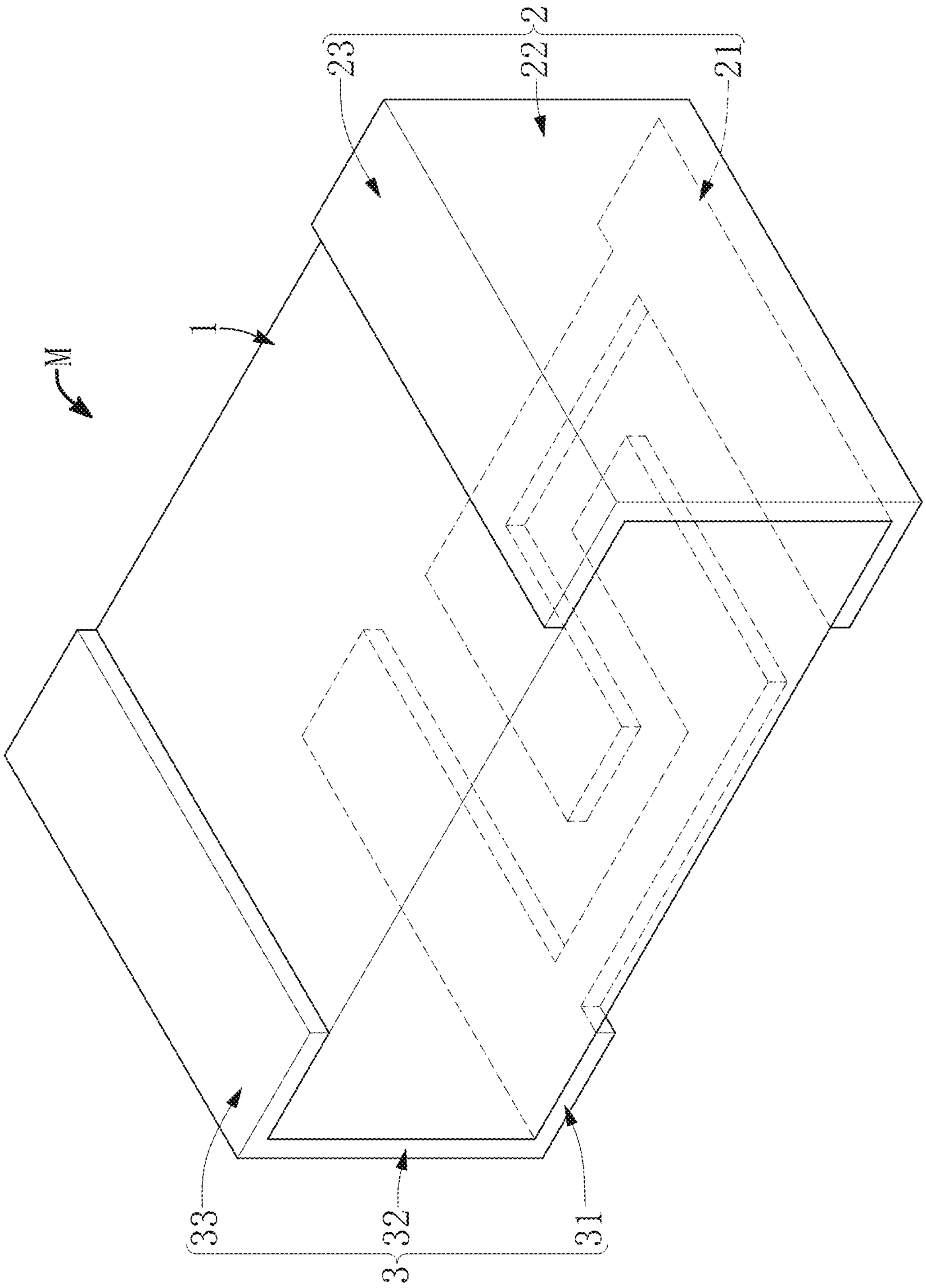
FIG. 11 is a schematic perspective view of the coupled antenna module according to a fourth embodiment of the present disclosure.

Referring to FIG. 11, a fourth embodiment of the present disclosure provides a coupled antenna module M, which includes an antenna carrying substrate 1, a first antenna structure 2 and a second antenna structure 3. The main difference between the fourth embodiment and the first embodiment is as follows: the coupled antenna module M provided by the fourth embodiment can be placed upside down (inversely) on a circuit substrate (not shown) when in use. That is to say, the coupled antenna module M can be used in different orientations (the forward orientation or the reverse orientation) according to the first embodiment (the forward orientation as shown in FIG. 1) or the fourth embodiment (the reverse orientation as shown in FIG. 11). Therefore, the first antenna structure 2 can be configured to be applied to a first antenna operating frequency range according to different requirements, and the second antenna structure 3 can be configured to be applied to a second antenna operating frequency range according to different requirements. However, the aforementioned details are disclosed for exemplary purposes only, and are not meant to limit the scope of the present disclosure.

Fifth Embodiment

Figure 12:
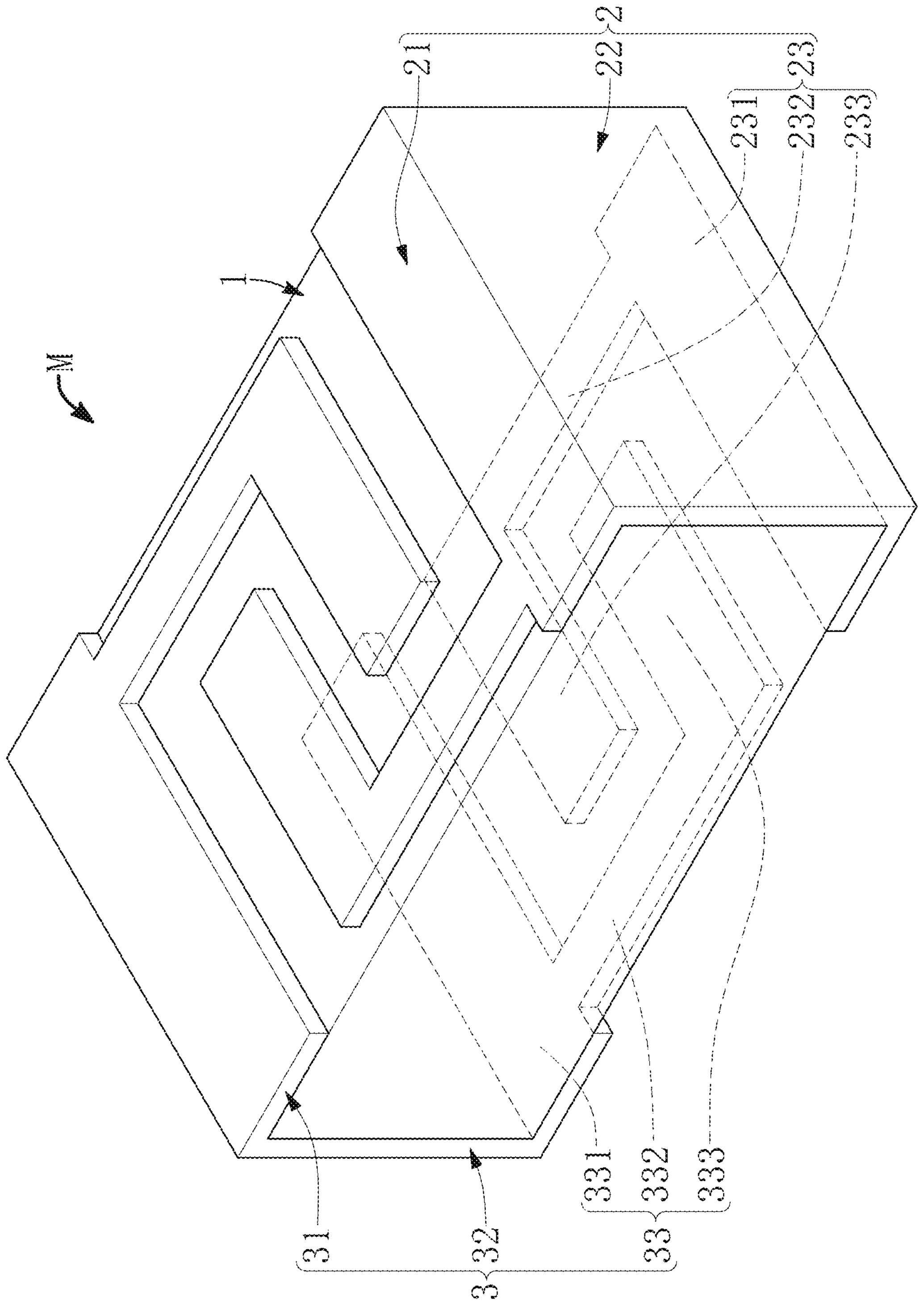
FIG. 12 is a schematic perspective view of the coupled antenna module according to a fifth embodiment of the present disclosure.

Referring to FIG. 12, a fifth embodiment of the present disclosure provides a coupled antenna module M, which includes an antenna carrying substrate 1, a first antenna structure 2 and a second antenna structure 3. The main difference between the fifth embodiment and the first embodiment is as follows: in the fifth embodiment, the first antenna structure 2 may have a first radiation layer 21 disposed on the upper surface of the antenna carrying substrate 1, a first extension layer 22 disposed on the first side surface of the antenna carrying substrate 1, and a first conductive layer 23 disposed on the lower surface of the antenna carrying substrate 1, and the first conductive layer 23 of the first antenna structure 2 may have a first base portion 231, a first extending portion 232 extending from the first base portion 231 toward the second side surface of the antenna carrying substrate 1, and a first bending portion 233 bending from the first extending portion 232 (such as bending about 90 degrees) toward the third side surface of the antenna carrying substrate 1. In addition, the second antenna structure 3 may have a second radiation layer 31 disposed on the upper surface of the antenna carrying substrate 1, a second extension layer 32 disposed on the second side surface of the antenna carrying substrate 1, and a second conductive layer 33 disposed on the lower surface of the antenna carrying substrate 1, and the second conductive layer 33 of the second antenna structure 3 may have a second base portion 331, a second extending portion 332 extending from the second base portion 331 toward the first side surface of the antenna carrying substrate 1, and a second bending portion 333 bending from the second extending portion 332 (such as bending about 90 degrees) toward the fourth side surface of the antenna carrying substrate 1. Therefore, the first antenna structure 2 can be configured to be applied to a first antenna operating frequency range according to different requirements, and the second antenna structure 3 can be configured to be applied to a second antenna operating frequency range according to different requirements. However, the aforementioned details are disclosed for exemplary purposes only, and are not meant to limit the scope of the present disclosure.

Sixth Embodiment

Figure 13:
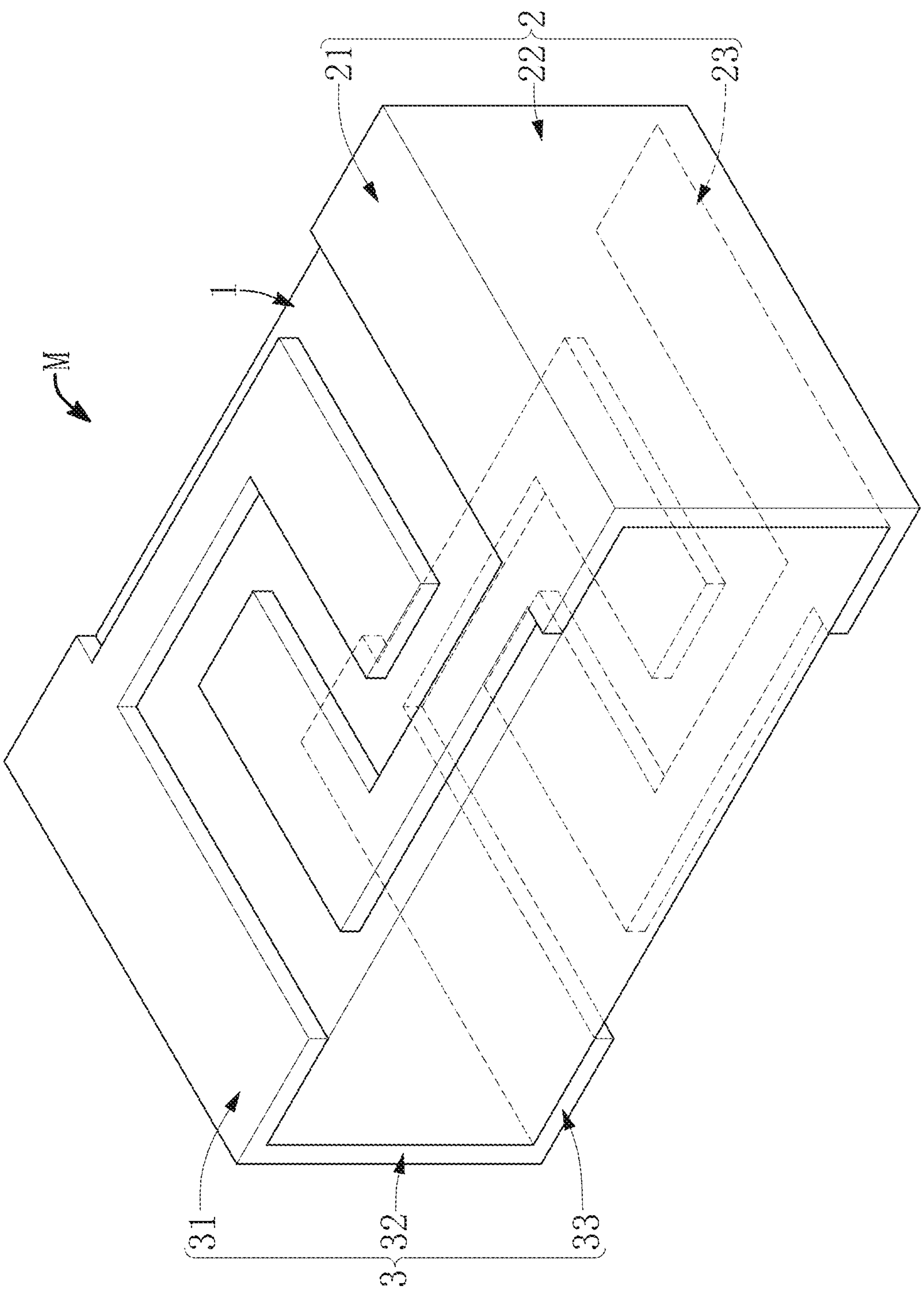
FIG. 13 is a schematic perspective view of the coupled antenna module according to a sixth embodiment of the present disclosure.

Referring to FIG. 13, a sixth embodiment of the present disclosure provides a coupled antenna module M, which includes an antenna carrying substrate 1, a first antenna structure 2 and a second antenna structure 3. The main difference between the sixth embodiment and the fifth embodiment is as follows: in the sixth embodiment, the first radiation layer 21 and the first conductive layer 23 of the first antenna structure 2 can be symmetrically arranged on the antenna carrying substrate 1 (that is to say, the first radiation layer 21 and the first conductive layer 23 can have the same pattern), and the second radiation layer 31 and the second conductive layer 33 of the second antenna structure 3 can be symmetrically arranged on the antenna carrying substrate 1 (that is to say, the second radiation layer 31 and the second conductive layer 33 can have the same pattern). Therefore, the first antenna structure 2 can be configured to be applied to a first antenna operating frequency range according to different requirements, and the second antenna structure 3 can be configured to be applied to a second antenna operating frequency range according to different requirements. However, the aforementioned details are disclosed for exemplary purposes only, and are not meant to limit the scope of the present disclosure.

Beneficial Effects of the Embodiments

In conclusion, in the coupled antenna module M provided by the present disclosure, by virtue of "the first antenna structure 2 having a first radiation layer 21 disposed on the upper surface 101 of the antenna carrying substrate 1, a first extension layer 22 disposed on the first side surface 103 of the antenna carrying substrate 1, and a first conductive layer 23 disposed on the lower surface 102 of the antenna carrying substrate 1," "the second antenna structure 3 having a second radiation layer 31 disposed on the upper surface 101 of the antenna carrying substrate 1, a second extension layer 32 disposed on the second side surface 104 of the antenna carrying substrate 1, and a second conductive layer 33 disposed on the lower surface 102 of the antenna carrying substrate 1," "the first radiation layer 21 of the first antenna structure 2 having a first base portion 211, a first extending portion 212 extending from the first base portion 211 toward the second side surface 104, and a first bending portion 213 bending from the first extending portion 211 toward the third side surface 105" and "the second radiation layer 31 of the second antenna structure 3 having a second base portion 311, a second extending portion 312 extending from the second base portion 311 toward the first side surface 103, and a second bending portion 313 bending from the second extending portion 311 toward the fourth side surface 106," the first antenna structure 2 can be configured to be applied to a first antenna operating frequency range according to different requirements, and the second antenna structure 3 can be configured to be applied to a second antenna operating frequency range according to different requirements. It should be noted that the first antenna operating frequency range can be greater than, equal to or less than the second antenna operating frequency range according to different requirements.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A coupled antenna module, comprising:

an antenna carrying substrate having an upper surface, a lower surface, a first side surface, a second side surface, a third side surface and a fourth side surface, wherein the upper surface and the lower surface correspond to each other, the first side surface and the second side surface are connected between the upper surface and the lower surface and correspond to each other, and the third side surface and the fourth side surface are connected between the upper surface and the lower surface and correspond to each other;

a first antenna structure disposed on the upper surface, the lower surface and the first side surface of the antenna carrying substrate; and a second antenna structure disposed on the upper surface, the lower surface and the second side surface of the antenna carrying substrate;

wherein the first antenna structure has a first radiation layer disposed on the upper surface of the antenna carrying substrate, a first extension layer disposed on the first side surface of the antenna carrying substrate, and a first conductive layer disposed on the lower surface of the antenna carrying substrate;

wherein the second antenna structure has a second radiation layer disposed on the upper surface of the antenna carrying substrate, a second extension layer disposed on the second side surface of the antenna carrying substrate, and a second conductive layer disposed on the lower surface of the antenna carrying substrate;

wherein an area of the first antenna structure is greater than, equal to or smaller than an area of the second antenna structure;

wherein the first antenna structure is configured to be applied to a first antenna operating frequency range, the second antenna structure is configured to be applied to a second antenna operating frequency range, and the first antenna operating frequency range is greater than, equal to or less than the second antenna operating frequency range;

wherein the first radiation layer of the first antenna structure has a first base portion, a first extending portion extending from the first base portion toward the second side surface, and a first bending portion bending from the first extending portion toward the third side surface;

wherein the second radiation layer of the second antenna structure has a second base portion, a second extending portion extending from the second base portion toward the first side surface, and a second bending portion bending from the second extending portion toward the fourth side surface;

wherein the first bending portion of the first radiation layer is disposed between the second base portion and the second bending portion of the second radiation layer, and the second bending portion of the second radiation layer is disposed between the first base portion and the first bending portion of the first radiation layer;

wherein the upper surface of the antenna carrying substrate has a continuous meandering area, and the continuous meandering area is located between the first antenna structure and the second antenna structure;

wherein the upper surface of the antenna carrying substrate has a first separation area connected to a first end of the continuous meandering area, and the first separation area is located between the first extending portion and the fourth side surface and between the first bending portion and the fourth side surface, thereby separating the first extending portion and the first bending portion of the first radiation layer from the fourth side surface by a first predetermined distance; and wherein the upper surface of the antenna carrying substrate has a second separation area connected to a second end of the continuous meandering area, and the second separation area is located between the second extending portion and the third side surface and between the second bending portion and the third side surface, thereby separating the second extending portion and the second bending portion of the second radiation layer from the third side surface by a second predetermined distance.

2. The coupled antenna module according to claim 1, wherein the first antenna structure is not disposed on the third side surface and the fourth side surface of the antenna carrying substrate, and the second antenna structure is not disposed on the third side surface and the fourth side surface of the antenna carrying substrate;

wherein the first extending portion and the first bending portion of the first radiation layer of the first antenna structure and the second extending portion and the second bending portion of the second radiation layer of the second antenna structure are completely covered by an insulating protective layer;

wherein the first base portion of the first radiation layer of the first antenna structure and the second base portion of the second radiation layer of the second antenna structure are partially covered by the insulating protective layer, and the insulating protective layer has a predetermined identification mark;

wherein, for the first radiation layer of the first antenna structure, a length of the first base portion is greater than a length of the first bending portion, the length of the first bending portion is greater than a length of the first extending portion, a width of the first base portion is greater than a width of the first bending portion, and the width of the first bending portion is greater than a width of the first extending portion;

wherein, for the second radiation layer of the second antenna structure, a length of the second base portion is greater than a length of the second bending portion, the length of the second bending portion is greater than a length of the second extending portion, a width of the second base portion is greater than a width of the second bending portion, and the width of the second bending portion is greater than a width of the second extending portion; and wherein an area of the first base portion of the first radiation layer is greater than, equal to or smaller than an area of the second base portion of the second radiation layer, an area of the first extending portion of the first radiation layer is greater than, equal to, or smaller than an area of the second extending portion of the second radiation layer, and an area of the first bending portion of the first radiation layer is greater than, equal to, or smaller than an area of the second bending portion of the second radiation layer.

3. The coupled antenna module according to claim 1, wherein the first base portion of the first radiation layer has a first lateral end flush with the third side surface and a second lateral end flush with the fourth side surface, and the second lateral end of the first base portion and the first extending portion are not flush with each other;

wherein the second base portion of the second radiation layer has a first lateral end flush with the fourth side surface and a second lateral end flush with the third side surface, and the second lateral end of the second base portion and the second extending portion are not flush with each other; and wherein the first extending portion of the first radiation layer is away from the first lateral end of the first base portion and adjacent to the second lateral end of the first base portion, and the second extending portion of the second radiation layer is away from the first lateral end of the second base portion and adjacent to the second lateral end of the second base portion.

4. A coupled antenna module, comprising:

an antenna carrying substrate having an upper surface, a lower surface, a first side surface, a second side surface, a third side surface and a fourth side surface;

a first antenna structure disposed on the upper surface, the lower surface and the first side surface of the antenna carrying substrate; and a second antenna structure disposed on the upper surface, the lower surface and the second side surface of the antenna carrying substrate;

wherein the first antenna structure has a first radiation layer disposed on the upper surface of the antenna carrying substrate, a first extension layer disposed on the first side surface of the antenna carrying substrate, and a first conductive layer disposed on the lower surface of the antenna carrying substrate;

wherein the second antenna structure has a second radiation layer disposed on the upper surface of the antenna carrying substrate, a second extension layer disposed on the second side surface of the antenna carrying substrate, and a second conductive layer disposed on the lower surface of the antenna carrying substrate;

wherein the first radiation layer of the first antenna structure has a first base portion, a first extending portion extending from the first base portion toward the second side surface, and a first bending portion bending from the first extending portion toward the third side surface;

wherein the second radiation layer of the second antenna structure has a second base portion, a second extending portion extending from the second base portion toward the first side surface, and a second bending portion bending from the second extending portion toward the fourth side surface;

wherein the upper surface of the antenna carrying substrate has a continuous meandering area, and the continuous meandering area is located between the first antenna structure and the second antenna structure;

wherein the upper surface of the antenna carrying substrate has a first separation area connected to a first end of the continuous meandering area, and the first separation area is located between the first extending portion and the fourth side surface and between the first bending portion and the fourth side surface, thereby separating the first extending portion and the first bending portion of the first radiation layer from the fourth side surface by a first predetermined distance; and wherein the upper surface of the antenna carrying substrate has a second separation area connected to a second end of the continuous meandering area, and the second separation area is located between the second extending portion and the third side surface and between the second bending portion and the third side surface, thereby separating the second extending portion and the second bending portion of the second radiation layer from the third side surface by a second predetermined distance.

5. The coupled antenna module according to claim 4, wherein the first antenna structure is not disposed on the third side surface and the fourth side surface of the antenna carrying substrate, and the second antenna structure is not disposed on the third side surface and the fourth side surface of the antenna carrying substrate;

wherein the first extending portion and the first bending portion of the first radiation layer of the first antenna structure and the second extending portion and the second bending portion of the second radiation layer of the second antenna structure are completely covered by an insulating protective layer;

wherein the first base portion of the first radiation layer of the first antenna structure and the second base portion of the second radiation layer of the second antenna structure are partially covered by the insulating protective layer, and the insulating protective layer has a predetermined identification mark;

wherein, for the first radiation layer of the first antenna structure, a length of the first base portion is greater than a length of the first bending portion, the length of the first bending portion is greater than a length of the first extending portion, a width of the first base portion is greater than a width of the first bending portion, and the width of the first bending portion is greater than a width of the first extending portion;

wherein, for the second radiation layer of the second antenna structure, a length of the second base portion is greater than a length of the second bending portion, the length of the second bending portion is greater than a length of the second extending portion, a width of the second base portion is greater than a width of the second bending portion, and the width of the second bending portion is greater than a width of the second extending portion; and wherein an area of the first base portion of the first radiation layer is greater than, equal to or smaller than an area of the second base portion of the second radiation layer, an area of the first extending portion of the first radiation layer is greater than, equal to, or smaller than an area of the second extending portion of the second radiation layer, and an area of the first bending portion of the first radiation layer is greater than, equal to, or smaller than an area of the second bending portion of the second radiation layer.

6. The coupled antenna module according to claim 4, wherein the first base portion of the first radiation layer has a first lateral end flush with the third side surface and a second lateral end flush with the fourth side surface, and the second lateral end of the first base portion and the first extending portion are not flush with each other;

wherein the second base portion of the second radiation layer has a first lateral end flush with the fourth side surface and a second lateral end flush with the third side surface, and the second lateral end of the second base portion and the second extending portion are not flush with each other; and wherein the first extending portion of the first radiation layer is away from the first lateral end of the first base portion and adjacent to the second lateral end of the first base portion, and the second extending portion of the second radiation layer is away from the first lateral end of the second base portion and adjacent to the second lateral end of the second base portion.

7. A coupled antenna module disposed between a first conductive layout layer and a second conductive layout layer of a circuit substrate, one of the first conductive layout layer and the second conductive layout layer electrically connected to an antenna signal feeding cable, and the coupled antenna module comprising:

an antenna carrying substrate having an upper surface, a lower surface, a first side surface, a second side surface, a third side surface and a fourth side surface;

a first antenna structure disposed on the upper surface, the lower surface and the first side surface of the antenna carrying substrate; and a second antenna structure disposed on the upper surface, the lower surface and the second side surface of the antenna carrying substrate;

wherein the first antenna structure has a first radiation layer disposed on the upper surface of the antenna carrying substrate, a first extension layer disposed on the first side surface of the antenna carrying substrate, and a first conductive layer disposed on the lower surface of the antenna carrying substrate;

wherein the second antenna structure has a second radiation layer disposed on the upper surface of the antenna carrying substrate, a second extension layer disposed on the second side surface of the antenna carrying substrate, and a second conductive layer disposed on the lower surface of the antenna carrying substrate;

wherein the first radiation layer of the first antenna structure has a first base portion, a first extending portion extending from the first base portion toward the second side surface, and a first bending portion bending from the first extending portion toward the third side surface;

wherein the second radiation layer of the second antenna structure has a second base portion, a second extending portion extending from the second base portion toward the first side surface, and a second bending portion bending from the second extending portion toward the fourth side surface;

wherein the upper surface of the antenna carrying substrate has a continuous meandering area, and the continuous meandering area is located between the first antenna structure and the second antenna structure;

wherein the upper surface of the antenna carrying substrate has a first separation area connected to a first end of the continuous meandering area, and the first separation area is located between the first extending portion and the fourth side surface and between the first bending portion and the fourth side surface, thereby separating the first extending portion and the first bending portion of the first radiation layer from the fourth side surface by a first predetermined distance; and wherein the upper surface of the antenna carrying substrate has a second separation area connected to a second end of the continuous meandering area, and the second separation area is located between the second extending portion and the third side surface and between the second bending portion and the third side surface, thereby separating the second extending portion and the second bending portion of the second radiation layer from the third side surface by a second predetermined distance.

8. The coupled antenna module according to claim 7, wherein the first conductive layout layer of the circuit substrate has a first vertical extension portion and a first horizontal extension portion connected to the first vertical extension portion, and the second conductive layout layer of the circuit substrate has a second vertical extension portion and a second horizontal extension portion connected to the second vertical extension portion;

wherein the circuit substrate has a middle area, a left area located beside a left side of the middle area, and a right area located beside a right side of the middle area, and the coupled antenna module is configured to be disposed on the middle area, the left area or the right area;

wherein the first vertical extension portion of the first conductive layout layer has a first signal feeding section electrically connected to the antenna signal feeding cable, a second signal feeding section electrically connected to the first horizontal extension portion, and a first electronic component electrically connected between the first signal feeding section and the second signal feeding section;

wherein the second vertical extension portion of the second conductive layout layer has a first vertical extending section insulated from the antenna signal feeding cable, a second vertical extending section electrically connected to the second horizontal extension portion, and a second electronic component electrically connected between the first vertical extending section and the second vertical extending section;

wherein the first horizontal extension portion of the first conductive layout layer has a first antenna carrying section, the second horizontal extension portion of the second conductive layout layer has a second antenna carrying section, and a width of the coupled antenna module is smaller than a width of the first antenna carrying section of the first horizontal extension portion and a width of the second antenna carrying section of the second horizontal extension portion;

wherein the first horizontal extension portion of the first conductive layout layer has a first left extending section electrically connected to the first antenna carrying section and the second signal feeding section, a first middle extending section located beside a right side of the first left extending section, a first right extending section located beside a right side of the first middle extending section and insulated from the first middle extending section, and a third electronic component electrically connected between the first left extending section and the first middle extending section;

wherein the second horizontal extension portion of the second conductive layout layer has a second right extending section electrically connected to the second antenna carrying section, a second middle extending section electrically connected to the second right extending section and the second vertical extending section, a second left extending section located beside a left side of the second middle extending section, and a fourth electronic component electrically connected between the second middle extending section and the second left extending section;

wherein the coupled antenna module is disposed between the first horizontal extension portion of the first conductive layout layer and the second horizontal extension portion of the second conductive layout layer, so that the first conductive layer of the first antenna structure and the second conductive layer of the second antenna structure are electrically connected to the first horizontal extension portion of the first conductive layout layer and said second horizontal extension portion of the second conductive layout layer through a plurality of conductive materials, respectively, or are electrically connected to the second horizontal extension portion of the second conductive layout layer and the first horizontal extension portion of the first conductive layout layer through the plurality of conductive materials, respectively; and wherein the first antenna carrying section of the first horizontal extension portion of the first conductive layout layer and the second antenna carrying section of the second horizontal extension portion of the second conductive layout layer are configured to carry the first conductive layer of the first antenna structure and the second conductive layer of the second antenna structure, respectively, or to carry the second conductive layer of the second antenna structure and the first conductive layer of the first antenna structure, respectively.

9. The coupled antenna module according to claim 7, wherein the first antenna structure is not disposed on the third side surface and the fourth side surface of the antenna carrying substrate, and the second antenna structure is not disposed on the third side surface and the fourth side surface of the antenna carrying substrate;

wherein the first extending portion and the first bending portion of the first radiation layer of the first antenna structure and the second extending portion and the second bending portion of the second radiation layer of the second antenna structure are completely covered by an insulating protective layer;

wherein the first base portion of the first radiation layer of the first antenna structure and the second base portion of the second radiation layer of the second antenna structure are partially covered by the insulating protective layer, and the insulating protective layer has a predetermined identification mark;

wherein, for the first radiation layer of the first antenna structure, a length of the first base portion is greater than a length of the first bending portion, the length of the first bending portion is greater than a length of the first extending portion, a width of the first base portion is greater than a width of the first bending portion, and the width of the first bending portion is greater than a width of the first extending portion;

wherein, for the second radiation layer of the second antenna structure, a length of the second base portion is greater than a length of the second bending portion, the length of the second bending portion is greater than a length of the second extending portion, a width of the second base portion is greater than a width of the second bending portion, and the width of the second bending portion is greater than a width of the second extending portion; and wherein an area of the first base portion of the first radiation layer is greater than, equal to or smaller than an area of the second base portion of the second radiation layer, an area of the first extending portion of the first radiation layer is greater than, equal to, or smaller than an area of the second extending portion of the second radiation layer, and an area of the first bending portion of the first radiation layer is greater than, equal to, or smaller than an area of the second bending portion of the second radiation layer.

10. The coupled antenna module according to claim 7, wherein the first base portion of the first radiation layer has a first lateral end flush with the third side surface and a second lateral end flush with the fourth side surface, and the second lateral end of the first base portion and the first extending portion are not flush with each other;

wherein the second base portion of the second radiation layer has a first lateral end flush with the fourth side surface and a second lateral end flush with the third side surface, and the second lateral end of the second base portion and the second extending portion are not flush with each other; and wherein the first extending portion of the first radiation layer is away from the first lateral end of the first base portion and adjacent to the second lateral end of the first base portion, and the second extending portion of the second radiation layer is away from the first lateral end of the second base portion and adjacent to the second lateral end of the second base portion.

* * * * *